(12) United States Patent  
Toyoshima

(10) Patent No.: US 7,083,519 B2  
(45) Date of Patent: Aug. 1, 2006

(54) GAME SYSTEM AND RELATED GAME MACHINE, CONTROL METHOD AND PROGRAM, OPERABLE WITH DIFFERENT INTERCHANGEABLE CONTROLLERS

(75) Inventor: Yosuke Toyoshima, Tokyo (JP)

(73) Assignee: Konami Corporation, Tokyo (JP)

( * ) Notice: Subject to any disclaimer, the term of this patent is extended or adjusted under 35 U.S.C. 154(b) by 596 days.

(21) Appl. No.: 10/277,080

(22) Filed: Oct. 22, 2002

(65) Prior Publication Data

US 2003/0083130 A1    May 1, 2003

(30) Foreign Application Priority Data

Oct. 26, 2001    (JP)    ............... 2001-328691

(51) Int. Cl.
*A63F 13/00*    (2006.01)
(52) U.S. Cl. ........................................... 463/36
(58) Field of Classification Search ............. 463/36–38
See application file for complete search history.

(56) References Cited

U.S. PATENT DOCUMENTS 5,393,072 A * 2/1995 Best ............................ 463/35

FOREIGN PATENT DOCUMENTS

| JP | 06-218142 A | 8/1884 |
| JP | 2000-157719 A | 6/2000 |
| WO | WO 00/59594 | * 10/2000 |
| WO | WO 00/59594 A1 | 10/2000 |

* cited by examiner

*Primary Examiner*—Kim Nguyen
(74) *Attorney, Agent, or Firm*—Sughrue Mion, PLLC

(57) ABSTRACT

A game machine allowing a player to preferably play a game using a controller which is equipped with only a smaller number of operation members, instead of a different type of controller. A controller type determining section (40) determines a type of a controller connected to a home-use game machine. Further, the table storage section 44 stores a key assigning table for each type of a controller, showing types of operation signals input from a controller and types of actions to be performed by an operation target of the controller. A table reading section (42) reads out a key assigning table correlated with the type of a controller connected to the home-use game machine (12) from a table storage section (44).

3 Claims, 7 Drawing Sheets

FIG. 2

| A | PUNCH |
|---|---|
| B | KICK |
| C | FATAL ATTACK 1 |
| D | FATAL ATTACK 2 |
| RIGHT | MOVE RIGHTWARD |
| LEFT | MOVE LEFTWARD |
| UP | JUMP |
| DOWN | SIT |

FIG. 3

| A | PUNCH |
|---|---|
| B | KICK |
| RIGHT | MOVE RIGHTWARD + FATAL ATTACK 1 |
| LEFT | MOVE LEFTWARD + FATAL ATTACK 2 |
| UP | JUMP |
| DOWN | SIT |

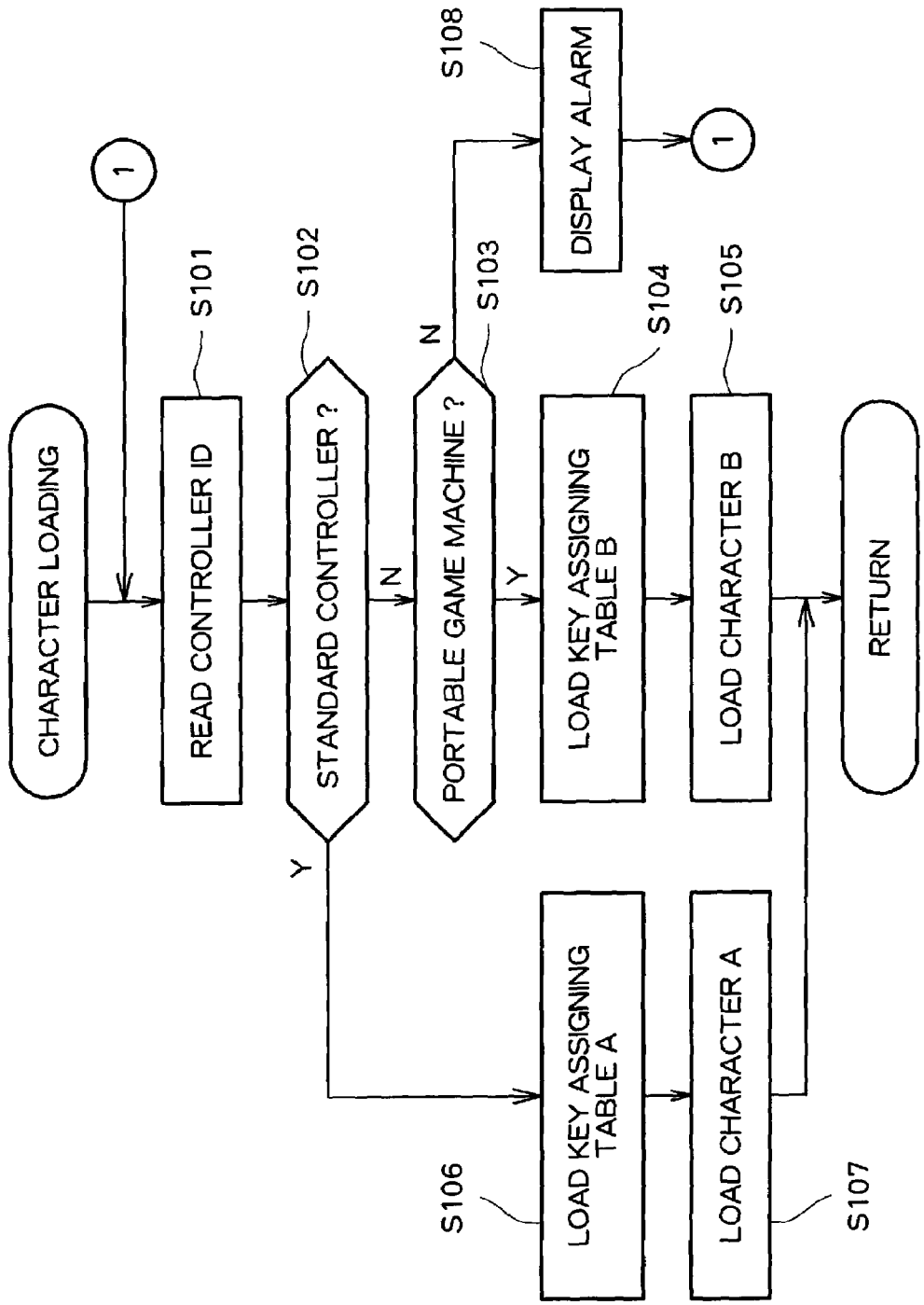

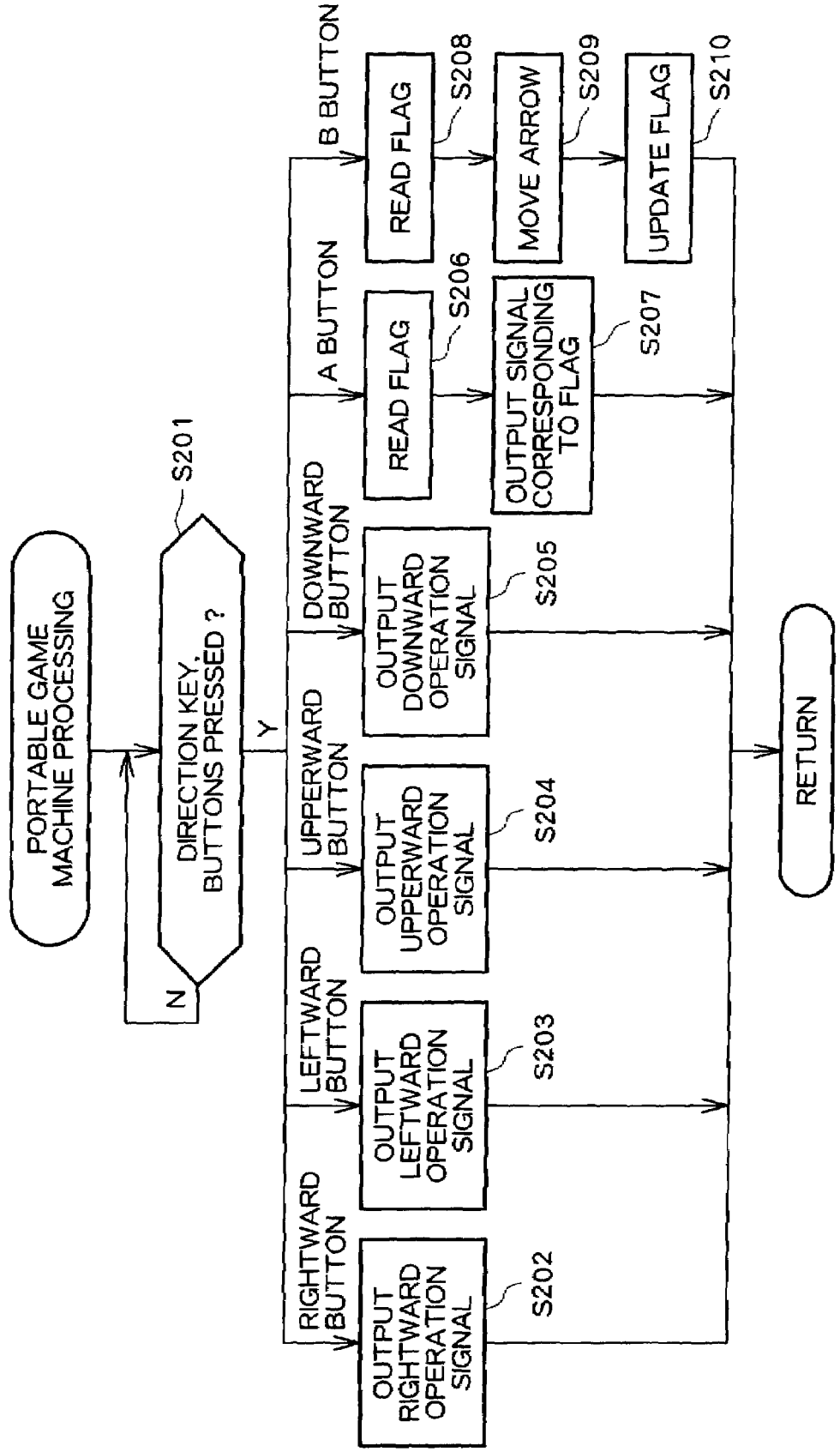

GAME SYSTEM AND RELATED GAME MACHINE, CONTROL METHOD AND PROGRAM, OPERABLE WITH DIFFERENT INTERCHANGEABLE CONTROLLERS

BACKGRAOUND OF THE PRESENT INVENTION

The present invention relates to a game machine, a game system, a control method for the game machine and system and a program.

Generally, home-use game machines are equipped with at least one (game) controller connection terminal so that a player can control an operation target displayed on a display means, such as a home-use television receiver, using, for example, an accessory standard (general-purpose) controller when connected to the controller connection terminal. Alternatively, a controller of a different type may be connected to the controller connection terminal so that the player can also control an operation target using that controller.

However, the number of operation members equipped to a controller for connection to the controller connection terminal of a home-use game machine may vary depending on the type. For example, where it has been proposed a game system in which a portable game machine can be connected to a home-use game machine, instead of or in addition to a standard controller, for use as a controller, many portable game machines, for which portability is generally important, may have only a smaller number of operation members than that of a standard controller of a home-use game machine. This may cause a problem that a player using such a portable game machine as a controller may not be able to fully enjoy a game which is configured based on the use of a standard controller.

SUMMARY OF THE INVENTION

The present invention has been conceived in view of the above, and aims to provide a game machine, a game system, a control method for the game machine and system, and a program which allow a player to preferably play a game using a controller equipped with only a smaller number of operation members, instead of a different type of controller.

In order to achieve the above objects, according to the present invention, there is provided a game machine connectable to a plurality of types of controllers, comprising: controller type determining means for determining a type of a controller connected to the game machine; table storage means for storing a table for each type of controller, the table showing a type of an operation signal input from the controller and a type of an action to be performed by an operation target of the controller; table reading means for reading from the table storage means a table corresponding to the type of the controller connected to the game machine; operation target displaying means for displaying an operation target of the controller connected to the game machine; and display control means for controlling displaying of the operation target such that the displayed operation target performs an action of a type correlated according to the table read from the table reading means, corresponding to a type of an operation signal input from the controller connected to the game machine.

According to another aspect of the present invention, there is provided a method for controlling a game machine connectable to a plurality of types of controllers, comprising the steps of: determining a type of a controller connected to the game machine; reading a table corresponding to a type of the controller connected to the game machine from table reading means for storing a table for each type of a controller, the table showing a kind of an operation signal input from the controller and a type of an action to be performed by an operation target of the controller; displaying an operation target of the controller connected to the game machine; and controlling displaying of the operation target such that the displayed operation target performs an action of a type, according to the table read from the table reading means, corresponding to a kind of an operation signal input from the controller connected to the game machine.

According to yet another aspect of the present invention, there is provided a program to be executed by a computer, such as a home-use game machine and a personal computer, which can be connected to a plurality of types of controllers. The program causes the computer to function as; controller type determining means for determining a type of a controller connected to the computer; table storage means for storing a table for each type of a controller, the table showing a type of an operation signal input from the controller and a type of an action to be performed by an operation target of the controller; table reading means for reading from the table storage means a table corresponding to the type of the controller connected to the computer; operation target displaying means for displaying an operation target of the controller connected to the computer; and display control means for controlling displaying of the operation target such that the displayed operation target performs an action of a type, according to the table read from the table reading means, corresponding to a kind of an operation signal input from the controller connected to the computer.

According to the present invention, a game machine (or a computer) is connectable to a plurality of types of controllers and a table is prepared showing kinds of operation signals from a controller and types of actions to be performed by an operation target to be controlled by the controller for each type of a controller. Specifically, the type of a controller connected to the game machine (or a computer) is determined, and a table corresponding to that type is read out. Further, an operation target to be controlled by the controller is displayed, and displaying of the operation target is controlled in response to an operation signal input from the controller, such that the operation target performs an action of the type according to the read table, corresponding to the type of that operation signal. This arrangement can realize a suitable operation system even when a controller equipped with a smaller number of operation members is used instead of a different type of controller, thus allowing the player to preferably enjoy the game.

In one embodiment of the present invention, the game machine may further comprise operation target image storage means for storing a plurality of operation target images corresponding to a type of a controller. In this game machine, the operation target displaying means reads out an operation target image corresponding to the type of a controller connected to the game machine from the operation target image storage means and displays the operation target based on the operation target image read.

According to yet another aspect of the present invention, there is provided a game system having a game machine and a controller for inputting an operation signal to the game machine. The game machine comprises operation target displaying means for displaying an operation target of the controller, and display control means for controlling displaying of the operation target based on an operation signal input from the controller. The controller comprises an operation member, an action type displaying means for displaying a type of an action the operation target performs when the operation member is operated, action type changing means for changing the type of the action displayed by the action type displaying means, and operation signal output means for outputting an operation signal for controlling the operation target so as to perform the action of the type being displayed by the action type displaying means when the operation member is operated.

According to yet another aspect of the present invention, there is provided a control method for a game system having a game machine and a controller for inputting an operation signal to the game machine. In this control method, the game machine performs the steps of: displaying an operation target of the controller; and controlling displaying of the operation target based on an operation signal input from the controller; and the controller performs the steps of: displaying a type of an action the operation target performs when the operation member is operated, changing the type of the action displayed on the display; and outputting an operation signal for controlling the operation target so as to perform the action of the type being displayed on the display when the operation member is operated.

According to yet another aspect of the present invention, there is provided a program to be executed by a computer which comprises an operation member and is used as a controller for another computer, such as a home-use game machine and a personal computer. The program causes the computer to function as: action type displaying means for displaying a type of an action which the operation object performs when the operation member is operated; action type changing means for changing the type of the action displayed by the action type displaying means, and operation signal output means for outputting an operation signal for controlling the operation target so as to perform the action of the type being displayed by the action type displaying means when the operation member is operated.

According to the present invention, a type of an action to be performed by an operation target when an operation member is operated may be displayed in the controller, and the displayed action type may change (selectable). When an operation member is operated, an operation signal for controlling the operation target so as to perform an action of the type displayed in the controller is output. The operation signal is then input to a game machine (i.e., a computer other than the one used as a controller), where displaying of the operation target to be controlled by the controller is controlled based on the input operation signal.

This arrangement allows the player to first confirm the type of an action currently displayed in the controller and then operate an operation member to thereby input to the game machine (a computer other than the one used as a controller) an operation signal for controlling the operation target so as to perform an action of that type. This makes it possible to control the operation target so as to perform a variety of actions, using a relatively smaller number of operation members, resultantly allowing the player to preferably play the game.

In one embodiment of the present invention, the action type changing means may change the type of the action based on an output of a timer. With this arrangement, a type of an action which the operation target will perform when an operation member is operated can change as time passes.

In one embodiment of the present invention, the action type changing means may change the type of an action based on operation of the controller. With this arrangement, a type of an action which the operation target will perform when the operation member is operated can be changed when the controller is operated using, for example, a different operation member.

BRIEF DESCRIPTION OF THE DRAWINGS

FIG. 2 is a diagram showing an example key assigning table corresponding to a standard controller;

FIG. 3 is a diagram showing an example key assigning table corresponding to a portable game machine;

FIG. 5 is a flowchart of character loading processing carried out by the home-use game machine in the first embodiment of the present invention;

FIG. 8 is a flowchart of processing carried out by the portable game machine in the second embodiment of the present invention.

DESCRIPTION OF PREFERRED EMBODIMENTS

The entire disclosure of the corresponding Japanese application 2001-328691 filed on Oct. 26, 2001 including specification, claims, drawings and summary, is incorporated herein by reference.

In the following, preferred embodiments of the present invention will be described in detailed based on the accompanying drawings.

EMBODIMENT 1

Figure 1:
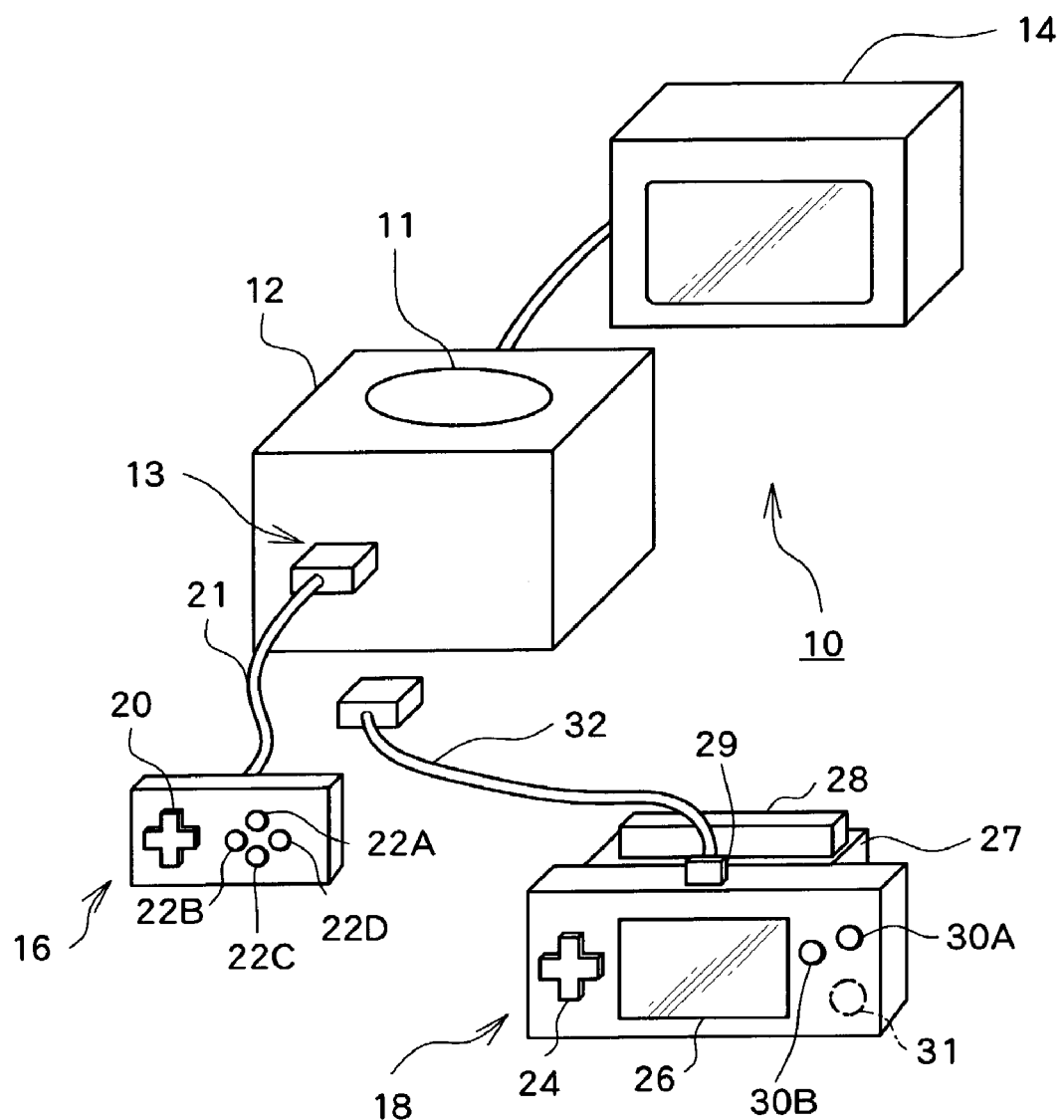
FIG. 1 is a perspective view showing a game system according to first and second embodiments of the present invention.

FIG. 1 is a diagram showing an overall structure of a game system according to a first embodiment of the present invention. As shown, the game system 10 comprises a home-use game machine 12, a home-use television receiver 14, a standard controller 16, and a portable game machine 18. The home-use game machine 12 is a known computer game system which has a CPU (Central Processing Unit) as a major component. When an information storage media such as a CD-ROM (Compact Disk-Read Only Memory), a DVD (Digital Versatile Disk), or the like, is attached to a tray 11, a game program stored in the information storage media is loaded therefrom and a game based on the loaded game program is presented to a player. Specifically, while game screen images and game sounds are output through the home-use television receiver 14, operation signals are received from the standard controller 16 or the portable game machine 18 so that a game character (an operation target) and so forth displayed on the game screen is controlled so as to act on the screen according to the received operation signal. It should be noted that a game program to be executed in the home-use game machine 12 may be supplied through a data communication network such as the Internet.

The standard controller 16 may be an accessory of the home-use game machine 12 and equipped with a relatively large number of general-purpose operation members so as to enable use with many different kinds of game programs. That is, a direction key 20 is an operation member through which "upward operation signals", "downward operation signals", "leftward operation signals", and "rightward operation signals" are inputted to the home-use game machine 12. Buttons 22A, 22B, 22C, and 22D are operation members through which "A operation signals", "B operation signals", "C operation signals", and "D operation signals", respectively, are inputted to the home-use game machine 12. The standard controller 16 is connected with a controller cable 21 and, when the controller cable 21 is connected to the controller connection terminal 13 of the home-use game machine 12, the standard controller 16 is set in a usable state.

The portable game machine 18 may be a known portable computer game system which has a CPU as a major component. Specifically, the portable game machine 18 comprises a direction key 24, buttons 30A and 30B, an LCD (Liquid Crystal Display) or other kinds of display 26, a speaker 31, a communication terminal 29, and a cartridge insertion inlet 27 into which a game cartridge 28 comprising a ROM (Read Only Memory) or a RAM (Random Access Memory) is inserted. The portable game machine 18 is driven by a battery. When a game cartridge 28 is inserted into the cartridge insertion inlet 27 and power is turned on, a game program stored in the game cartridge 28 is read therefrom and a game based on the read game program is presented to the player. Specifically, while game screen images and game sounds are output through the display 26 and speaker 31, respectively, operation signals are received from the direction key 24 and/or buttons 30A, 30B so that a game character (an operation target) shown on the game screen is controlled so as to act on the game screen according to the received operation signal.

Further, when one end of the controller cable 32 is connected to the communication terminal 29 of the portable game machine 18 and the other end is connected to the controller connection terminal 13 of the home-use game machine 12, the game machine 18 is set in a state allowing it to serve as a controller of the home-use game machine 12. A program for causing the portable game machine 18 to function as a controller of the home-use game machine 12 may be stored in a game cartridge 28 and supplied therefrom to the game machine 18. Alternatively, the program may be supplied via the controller cable 32 from the home-use game machine 12 to the portable game machine 18. When the portable game machine 18 is used as a controller of the home-use game machine 12, "A operation signals", corresponding to the button 30A, "B operation signals", corresponding to the button 30B, "upward operation signals", "downward operation signals", "rightward operation signal", and "leftward operation signal", these four corresponding to the direction key 24, can be input from the portable game machine 18 to the home-use game machine 12.

The home-use game machine 12 can detect whether a standard controller 16 or a portable game machine 18 is connected to its controller connection terminal 13. Specifically, the standard controller 16 and the portable game machine 18 both input their controller IDs (controller identification information) to the home-use game machine 12 when inputting an operation signal to the home-use game machine 12 or in response to an inquiry from the home-use game machine 12 so that the home-use game machine 12 can determine the type of a controller presently connected to its controller connection terminal 13 based on the input controller ID.

In addition, the home-use game machine 12 stores key assigning tables shown in FIGS. 2 and 3, which have been obtained beforehand. These key assigning tables may be supplied from, for example, an information storage media mounted to the tray 11 or over a data communication network such as the Internet to the home-use game machine 12.

The key assigning table of FIG. 2 is held in the home-use game machine 12 so as to correspond to the standard controller 16. This key assigning table shows correlated information about kinds of operation signals and corresponding types of actions of the operation target (for example, a game character). Specifically, where the standard controller 16 can input eight kinds of operation signals (four kinds corresponding to the direction key 20 and another four kinds corresponding to the buttons 22A to 22D) to the home-use game machine 12, as described above, the key assigning table of FIG. 2 shows correspondence information about these eight kinds of operation signals and types of actions of the operation target. Therefore, upon receipt of an operation signal from the standard controller 16, the home-use game machine 12 determines the type of an action corresponding to the kind of that operation signal with reference to the table, and controls displaying of the operation target on the television receiver 14 such that the displayed operation target performs an action of that kind. For example, when the button 22A is pressed and an A operation signal is thereby input from the standard controller 16, the home-use game machine 12 controls the operation target displayed on the home-use television receiver 14 so as to throw a punch. For another example, when the direction key 20 is pressed and a downward operation signal is thereby input from the standard controller 16, the home-use game machine 12 controls the operation target displayed on the home-use television receiver 14 so as to sit down.

Meanwhile, the key assigning table of FIG. 3 is held in the home-use game machine 12 so as to correspond to the portable game machine 18. This key assigning table also shows kinds of operation signals and corresponding types of actions of the operation target (for example, a game character). Specifically, where the portable game machine 18 used as a controller can input six kinds of operation signals (four kinds corresponding to the direction key 24 and two kinds corresponding to the buttons 30A and 30B) to the home-use game machine 12, as described above, the key assigning table of FIG. 3 shows correspondence information about these six kinds of operation signals and types of actions of the operation target. Therefore, upon receipt of an operation signal input through the portable game machine 18, the home-use game machine 12 determines the type of an action corresponding to the kind of that operation signal with reference to the table, and controls displaying of the operation target on the television receiver 14 such that the displayed operation target performs an action of that kind. For example, when the button 30A is pressed and an A operation signal is thereby input from the portable game machine 18, the home-use game machine 12 controls the operation target displayed on the home-use television receiver 14 so as to throw a punch. For another example, when the direction key 24 is pressed and a downward operation signal is thereby input through the portable game machine 18, the home-use game machine 12 controls the operation target displayed on the home-use television receiver 14 so as to repeatedly give fatal attacks 1 while moving rightward.

Figure 4:
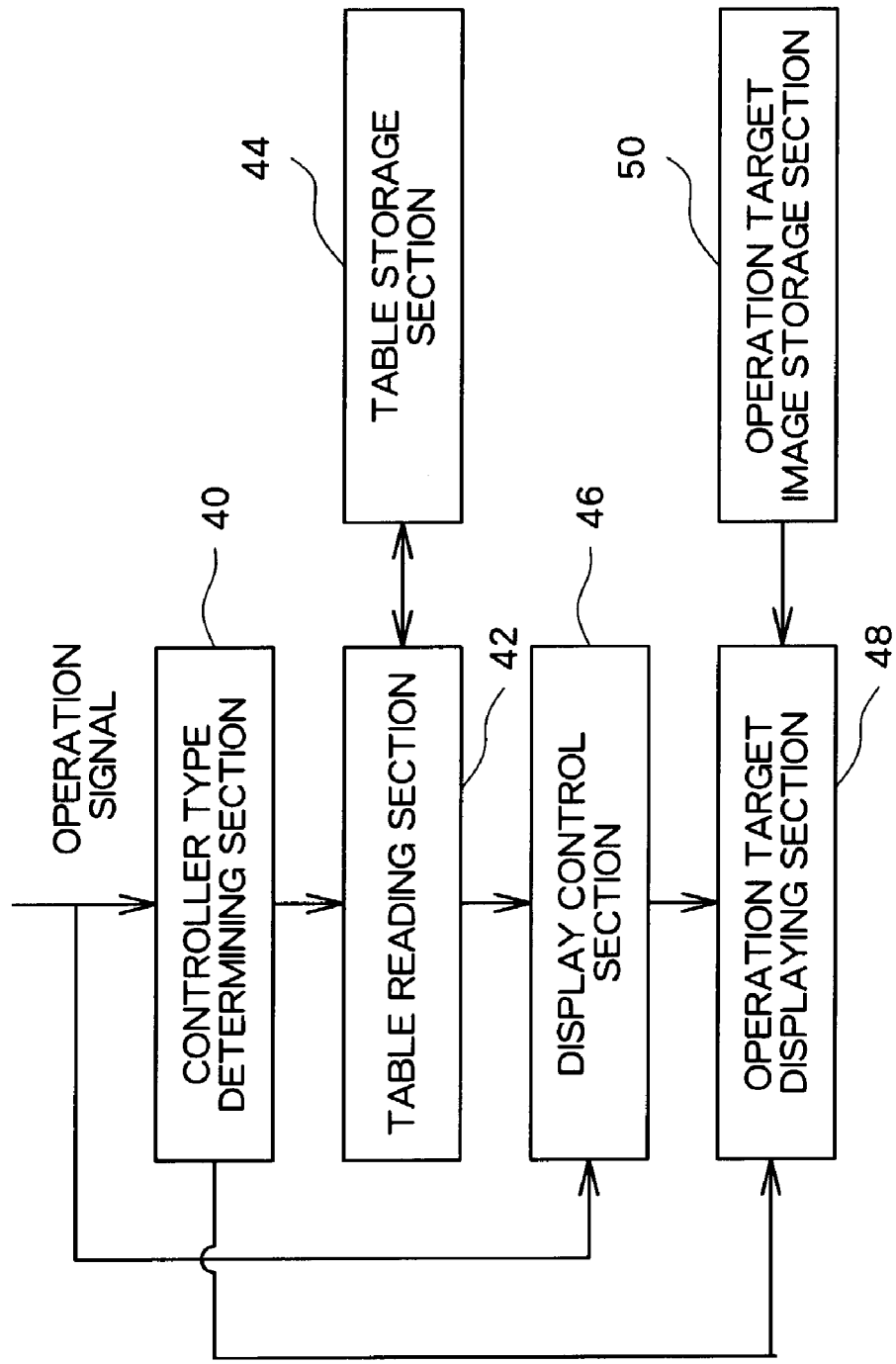
FIG. 4 is a functional block diagram showing functions realized by the home-use game machine in the first embodiment of the present invention.

FIG. 4 is a diagram showing mainly functional blocks relevant to the present invention among those which are realized in the home-use game machine 12. The respective shown functions are realized by executing a game program using the home-use game machine 12. As shown, the home-use game machine 12 implements a controller type determining section 40, a table reading section 42, a table storage section 44, a display control section 46, an operation target displaying section 48, and an operation target image storage section 50.

Among those sections, the controller type determining section 40 determines the type of a controller connected to the home-use game machine 12 (for example, whether a controller is a standard controller 16 or a portable game machine 18) based on the controller ID input from the controller. The table storage section 44 comprises, for example, a RAM or an information storage media mounted to the tray 11 and stores, for each type of controller, a key assigning table which shows correspondence information about kinds of operation signals input through a controller and types of actions of an operation target to be controlled by the controller. The table reading section 42 may comprise a CPU and so forth and reads out from the table storage section 44 a key assigning table which corresponds to the type of a controller connected to the home-use game machine 12. The operation target displaying section 48 may comprise a CPU and so forth and displays on the home-use television receiver 14 an operation target (a game character) to be controlled by a controller connected to the home-use game machine 12. The display control section 46 may comprise a CPU and so forth and controls displaying of an operation target such that the displayed operation target performs an action of the type which, according to the key assigning table read out by the table reading section 42, corresponds to the kind of operation signal input from the controller connected to the home-use game machine 12. The operation target image storage section 50 may comprise a RAM or an information storage media mounted on the tray 11 and stores a plurality of operation target images which respectively correspond to types of controllers. The operation target displaying section 48 reads out an operation target image which corresponds to the type of a controller connected to the home-use game machine 12 from the operation target image storage section 50, and displays an operation target based on the read operation target image.

FIG. 5 is a flowchart of character loading processing executed by the home-use game machine 12. The character loading processing is applied at timing between initialization of the home-use game machine 12 and beginning of a game. Specifically, the controller type determining section 40 reads out a controller ID from the controller (either a standard controller 16 or a portable game machine 18) (S101) and determines the type of a controller connected to the controller connection terminal 13 based on the controller ID. When it is determined that the connected controller is a standard controller 16 (S102), the table reading section 42 reads out a key assigning table of FIG. 2 from the table storage section 44 (S106) and the operation target displaying section 48 reads out an operation target image (a game character image) corresponding to the standard controller 16 from the operation target image storage section 50 (S107). Thereupon, the character loading processing is completed. With completion of the character loading processing, known conventional game processing is applied. In particular, for displaying an operation target, the operation target displaying section 48 displays an image of the operation target on the home-use television receiver 14 based on the operation target image read out at S107. Also, for controlling displaying of the operation target based on an operation signal (such that the displayed operation target performs various actions on the game screen), the display control section 46 determines the type of an action corresponding to the kind of the operation signal with reference to the key assigning table read out at S106.

Meanwhile, when it is determined at S102 that the controller connected to the controller connection terminal 13 is not a standard controller 16, whether or not the controller connected to the controller connection terminal 13 is a portable game machine 18 is determined (S103). When the determination is YES, the table reading section 42 reads out a key assigning table of FIG. 3 from the table storage section 44 (S104) and the operation target displaying section 48 reads out an operation target image (a game character image) correlating with the portable game machine 18 from the operation target image storage section 50 (S105). Thereupon, the character loading processing is completed. With completion of the character loading processing, known conventional game processing is applied. In particular, for displaying the operation target, the operation target displaying section 48 displays an image of the operation target at the home-use television receiver 14 based on the operation target image read out at S105. Also, for controlling displaying of the operation target based on the operation signal, the display control section 46 determines the type of action corresponding to the kind of operation signal with reference to the key assigning table read out at S104. Here, when it is determined in S103 that the controller connected to the controller connection terminal 13 is not a portable game machine 18, the controller type determining section 40 displays an alarm message such as "connect a standard controller or a home-use game machine" on the home-use television receiver 14 (S108) and the processing returns to S101.

In the first embodiment described above, when an operation signal is input from either a standard controller 16 or a portable game machine 18, the type of action correlated with the kind of that operation signal is determined with reference to the key assigning table which is correlated with the type of the connected controller, and displaying of the operation target such as a game character is controlled accordingly. This makes it possible for the player to preferably play the game even using a portable game machine 18 which is equipped with only a smaller number of operation members.

EMBODIMENT 2

In a second embodiment of the present invention, an assistant screen image for inputting an operation signal is displayed on the display 26 of the portable game machine 18. The assistant screen image may be displayed based on, for example, a game program which is either stored in the game cartridge 28 mounted to the portable game machine 18 or supplied from the home-use game machine 12. Because the game system in the second embodiment is presumed to have a structure identical to that of the game system 10 in the first embodiment, FIG. 1 is also referred to in the following description.

Figure 6A:
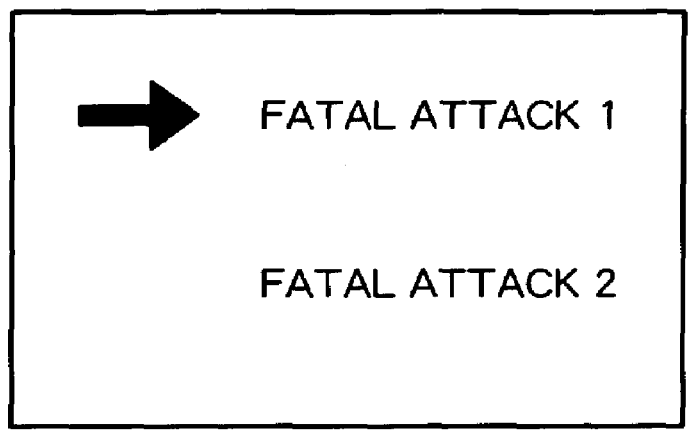
FIG. 6 is a diagram showing an example assistant screen image displayed in the portable game machine in the second embodiment of the present invention.
Figure 6B:
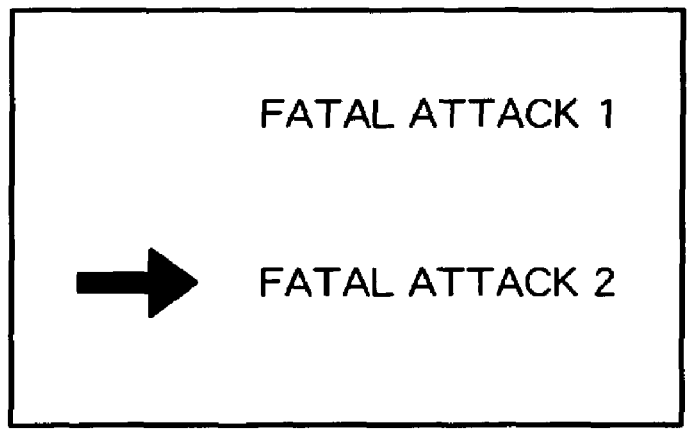

In the second embodiment, an assistant screen image of FIG. 6A or 6B, for example, is shown on the display of the portable game machine 18. The example assistant screen image of FIG. 6A may include texts "fatal attack 1", and "fatal attack 2" arranged vertically with an arrow directing the text "fatal attack 1" on its left side. The example assistant screen image of FIG. 6B may similarly include texts "fatal attack 1" and "fatal attack 2" arranged vertically with an arrow directing the text "fatal attack 2" on its left side. In the second embodiment, every time the button 30B of the portable game machine 18 is pressed, the assistant screen images of FIGS. 6A and 6B alternately appear on the display 26. Then, pressing the button 30A with the assistant screen image of FIG. 6A displayed on the display 26 can cause the operation target (a game character) shown on the home-use television receiver 14 to repeatedly make a "fatal attack 1". Likewise, pressing the button 30A with the assistant screen image of FIG. 6B displayed on the display 26 can cause the operation target (game character) shown on the home-use television receiver 14 to repeatedly make a "fatal attack 2". That is, the assistant screen images of FIGS. 6A and 6B each show a type of action which an operation target will perform when the button 30 A (an operation member) is pressed.

Figure 7:
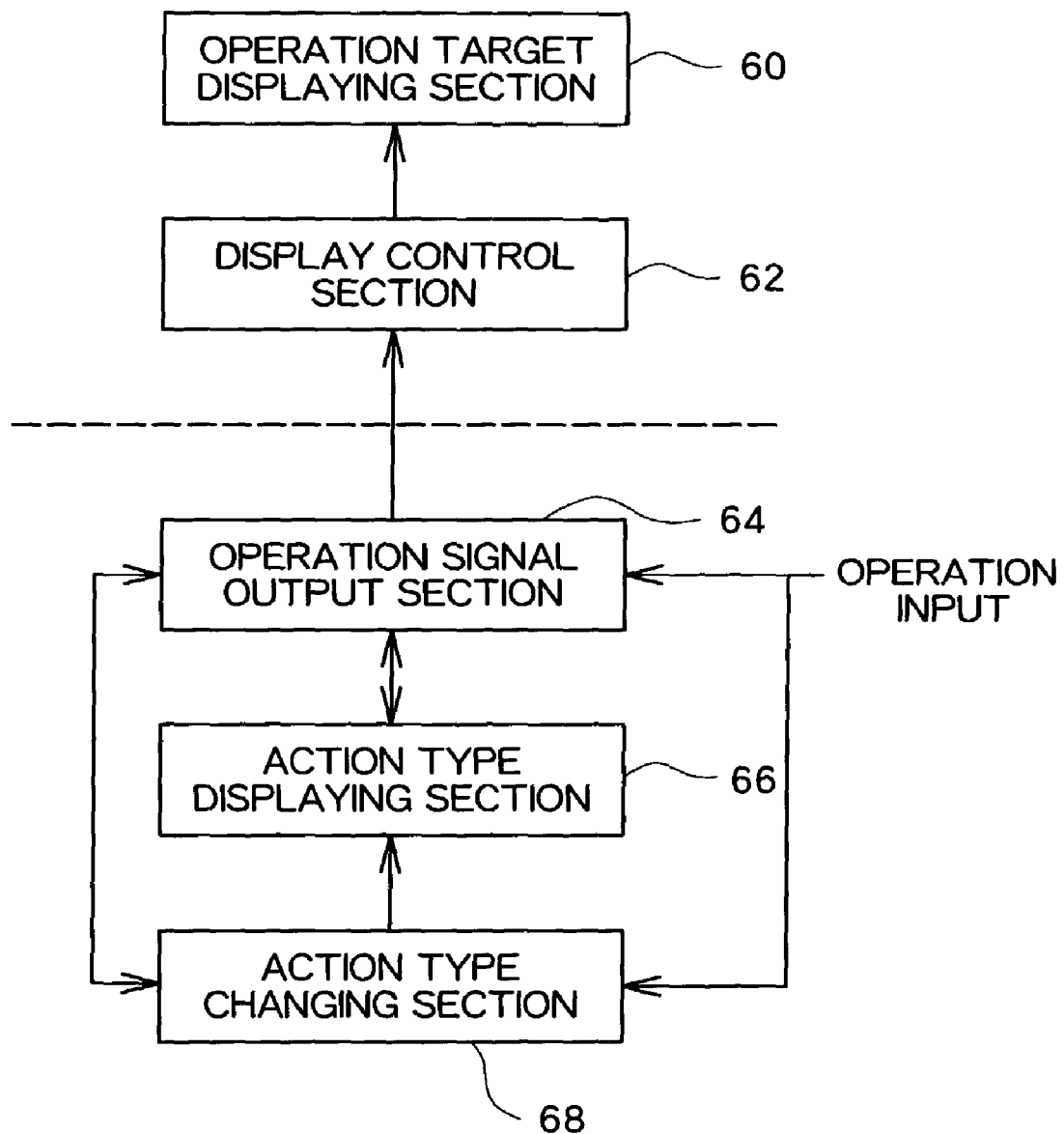
FIG. 7 is a functional diagram showing functions realized by the home-use game machine and the portable game machine in the second embodiment of the present invention.

FIG. 7 is a diagram mainly showing functional blocks relevant to the present invention among those which are realized in the game system 10. As shown, the game system 10 realizes an operation target displaying section 60, a display control section 62, and an operation signal output section 64, an action type displaying section 66, and an action type changing section 68. Among those sections, the operation target displaying section 60 and the display control section 62 are realized by executing a game program by the home-use game machine 12. The operation signal output section 64, the action type displaying section 66, and the action type changing section 68 are realized by executing a game program using the portable game machine 18.

Here, the operation target displaying section 60 comprises a CPU and so forth and displays an operation target to be controlled by a controller (including a portable game machine 18). The display control section 62 controls displaying of the operation target based on an operation signal input from the controller (including a portable game machine 18). The action type displaying section 66 displays, as an assistant screen image, a type of action the operation target will perform when the button A (an operation member) is pressed. The action type changing section 68 changes the type of action displayed on the display 26 by the action type displaying section 66. The action type changing section 68 changes the type of action displayed on the display 26 according to operation of the button 30B here, though a timer function (a clock) may be set usable so that the type of action shown on the display 26 may be changed based on an output of the timer function (a timer output). The operation signal output section 64 outputs, when the button 30A is operated, an operation signal for controlling the operation target so as to perform an action of the type which is displayed on the display 26 (that is, an action of the type pointed to by an arrow on the assistant input screen image) by the action type displaying section 66. This operation signal is input via the controller cable 32 to the display control section 62 of the home-use game machine 13. Based on the input operation signal, the display control section 62 controls the operation target displayed in the home-use television receiver 14 so as to perform an action of the type displayed on the display 26 by the action type displaying section 66.

Here, processing executed by the portable game machine 18 used as a controller will be described in further detail. FIG. 8 is a flowchart explaining processing executed by the portable game machine 18. As shown, with the portable game machine 18 used as a controller, the operation signal output section 64 and the action type changing section 68 detect when the direction key 24 and buttons 30A and 30B are pressed (S201). When it is determined that the direction key 24 is operated whereby a rightward, leftward, upward, or downward action operation is commanded, the operation signal output section 64 outputs a rightward, leftward, upward, or downward operation signal, respectively (S202, S203, S204, and S205).

Meanwhile, when it is determined at step 201 that the button 30A is pressed, the operation signal output section 64 reads out a flag managed by and stored in the operating type changing section 68 (S206) and outputs an operation signal corresponding to the fatal attack 1 or 2 corresponding to the flag (S207).

That is, the action type changing section 68 manages and stores a flag which corresponds to one of the fatal attacks 1 and 2 currently pointed to by an arrow in the assistant screen image shown on the display 26. Then, the operation signal output section 64 reads out the flag to determine which one of the fatal attacks 1 and 2 is currently pointed by the arrow in the assistant screen image shown on the display 26 and, based on the determination, outputs an operation signal corresponding to either the fatal attack 1 or 2.

Alternatively, when it is determined in step 201 that the button 30B is pressed, the action type changing section 68 reads out the flag (S208), determines which one of the fatal attacks 1 and 2 is currently pointed to by the arrow on the assistant screen image presently shown on the display 26, based on the read flag, and then controls the action type displaying section 66 based on the determination so as to display an assistant screen image in which one of the fatal attacks 1 and 2 other than the one currently pointed to by the arrow is pointed to by the arrow (S209). Thereafter, the action type changing section 68 updates the flag such that a flag corresponding to one of the fatal attacks 1 and 2 which is newly pointed by the arrow, is stored. That is, when it is the fatal attack 1 which is determined as being currently pointed to by the arrow in the assistant screen image shown in the display 26, the action type changing section 68 updates the flag such that the flag corresponds to the fatal attack 2, and alternatively, when it is the fatal attack 2 which is determined as currently being pointed to by the arrow, the flag is updated so as to correspond to fatal attack 1 (S210).

In the second embodiment described above, types of actions are shown on the display 26 of the portable game machine 18 used as a controller, and the displayed type of an action can be changed every time the button 30B is pressed or in response to a timer output. When the button 30A is pressed, the operation target displayed on the display 26 is controlled so as to perform an action of the type (fatal attack 1 or fatal attack 2) which is then displayed on the display 26. This makes it possible to control the operation target using a relatively smaller number of buttons so as to perform a variety of actions.

What is claimed is:

1. A game machine connectable to a plurality of types of controllers, comprising:
   controller type determining means for determining a type of a controller connected to the game machine;
   table storage means for storing a table for each type of a controller, the table showing a type of an operation signal input from the controller and a type of an action to be performed by an operation target of the controller;
   table reading means for reading from the table storage means a table corresponding to the type of the controller connected to the game machine;

operation target displaying means for displaying an operation target of the controller connected to the game machine;

display control means for controlling displaying of the operation target such that the displayed operation target performs an action of a type, according to the table read from the table reading means, corresponding to a kind of an operation signal input from the controller connected to the game machine; and operation target image storage means for storing a plurality of operation target images correlated with a type of a controller, wherein the operation target displaying means reads out an operation target image correlated with the type of the controller connected to the game machine from the operation target image storage means and displays the operation target based on the operation target image read.

2. A method for controlling a game machine connectable to a plurality of types of controllers, comprising the steps of:

determining a type of a controller connected to the game machine;

reading a table corresponding to a type of the controller connected to the game machine from table reading means for storing a table for each type of controller, the table showing a type of an operation signal input from the controller and a type of an action to be performed by an operation target of the controller;

displaying an operation target of the controller connected to the game machine;

controlling displaying of the operation target such that the displayed operation target performs an action of a type, according to the table read from the table reading means, corresponding to a type of an operation signal input from the controller connected to the game machine; and reading out an operation target image correlated with the type of the controller connected to the game machine from an operation target image storage means and displaying the operation target based on the operation target image read.

3. A program embodied in a computer-readable medium and to be executed by a computer connectable to a plurality of kinds of controllers, for controlling the computer to function as;

controller type determining means for determining a type of a controller connected to the computer;

table storage means for storing a table for each type of controller, the table showing a kind of an operation signal input from the controller and a type of an action to be performed by an operation target of the controller;

table reading means for reading from the table storage means a table corresponding to the type of the controller connected to the computer;

operation target displaying means for displaying an operation target of the controller connected to the computer;

display control means for controlling displaying of the operation target such that the displayed operation target performs an action of a type, according to the table read from the table reading means, corresponding to a type of an operation signal input from the controller connected to the computer; and operation target image storage means for storing a plurality of operation target images correlated with a type of a controller, wherein the operation target displaying means reads out an operation target image correlated with the type of the controller connected to the game machine from the operation target image storage means and displays the operation target based on the operation target image read.

* * * * *